UNITED STATES PATENT OFFICE.

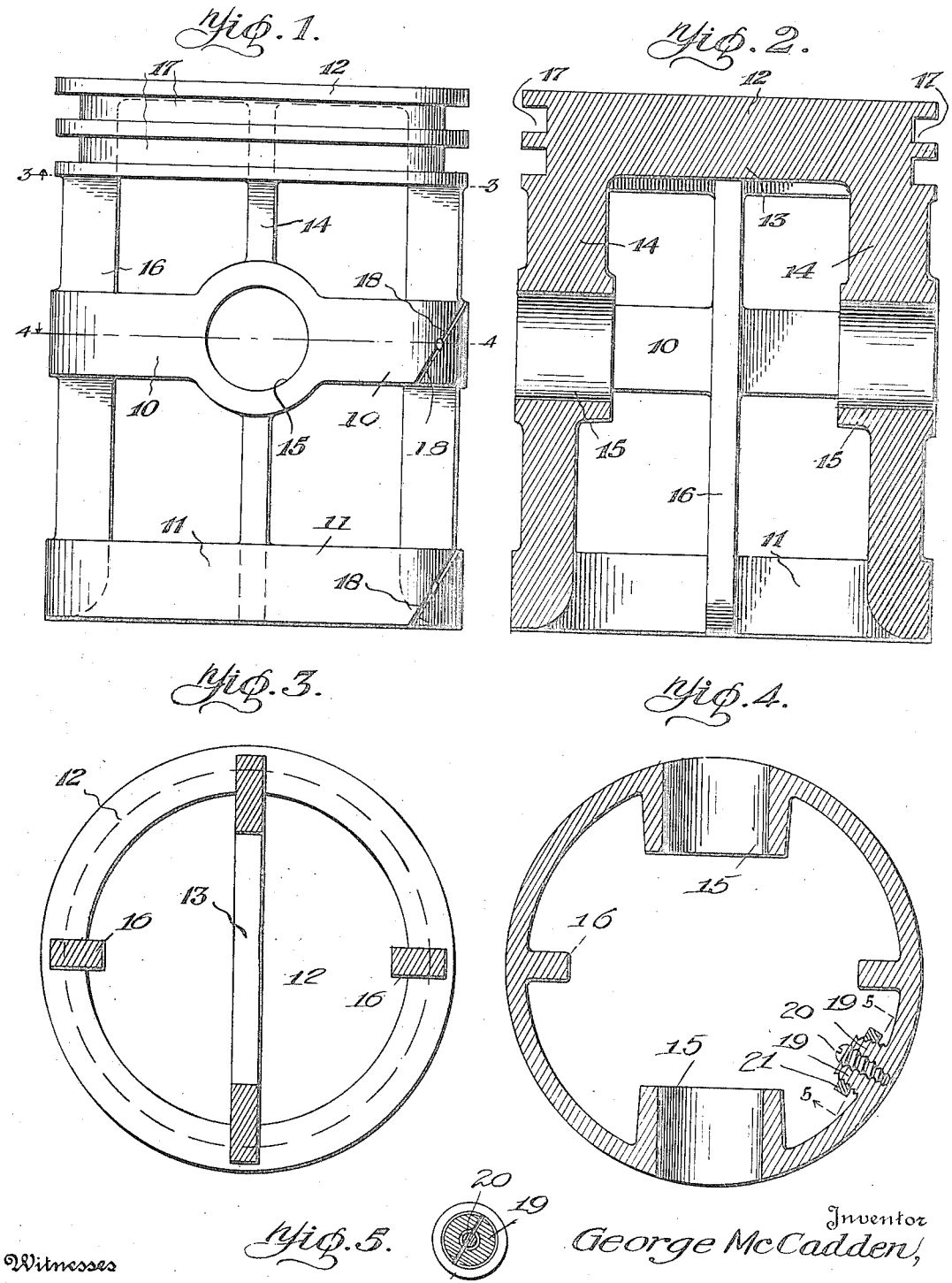

GEORGE McCADDEN, OF ST. CLOUD, MINNESOTA.

SKELETON ADJUSTABLE PISTON.

1,302,572.　　　　　Specification of Letters Patent.　　　Patented May 6, 1919.

Application filed May 7, 1918. Serial No. 233,135.

*To all whom it may concern:*

Be it known that I, GEORGE McCADDEN, a citizen of the United States, and a resident of St. Cloud, in the county of Stearns and State of Minnesota, have invented a new and useful Improvement in Skeleton Adjustable Pistons, of which the following is a specification.

My present invention relates generally to pistons for explosive engines, and more particularly to a lightweight piston of skeleton formation and adjustable in order to compensate for wear, my object being the provision of a novel and inexpensive construction whereby a piston of the above general type may be produced.

My invention resides generally in a piston of the construction to be now described with reference to the accompanying drawings, forming a part of this specification, and in which:

Figure 1 is a side view of my improved piston.

Fig. 2 is a central vertical section taken therethrough.

Figs. 3 and 4 are horizontal sections taken respectively, on lines 3—3 and 4—4 of Fig. 1, and Fig. 5 is a detail section taken substantially on line 5—5 of Fig. 4.

Referring now to these figures, my invention proposes a lightweight piston in which the usual solid skirt portion is done away with and intermediate and base rings 10 and 11 substituted therefor. The head 12 of the piston is closed, and diametrically across its lower inner face, a rib 13 is formed and connects the upper end of diametrically opposed ribs 14 between the respective sides of the head 12 and the rings 10 and 11, the intermediate ring 10 of which is enlarged and bored at diametrically opposite points to form the bearings 15 for the usual wrist pin.

The rib 13 at the head 12 and the upper portion of the ribs 14, thus form substantially a U-shaped bridge which in operation transmits each power impulse of explosion, directly to the wrist pin in the bearings 15.

At diametrically opposite points of the piston, and at right angles with respect to the plane of the ribs 14, vertical ribs 16 also connect the head 12 and the rings 10 and 11, the spaces between these rings, ribs, and head 12, being open, so as to reduce friction as well as eliminate unnecessary weight.

The head 12 has annular grooves 17, as usual, for the reception of piston rings, and in accordance with my improvements, each of the rings 10 and 11 is split at 18. These split portions while shown diagonal in order to avoid scoring the inner surface of a cylinder in connection with which the piston is utilized, may be vertical, and in either event the inner portion of each ring adjacent its split 18, has inwardly extending and externally threaded portions 19, as seen in Figs. 4 and 5, forming a split boss, the inner and external surfaces of which are threaded and tapered, the former for the reception of a wedge screw 20, and the latter for the reception of a threaded clamping ring 21. Thus, when it is desired to slightly increase the diameter of either of the rings, or both thereof, in order to compensate for wear, the clamping rings 21 are loosened and the screws 20 turned inwardly so as to wedge the split ends of the rings apart. When the required adjustment is made, the clamping rings 21 are again turned tightly in position so as to clamp the portions of the boss 19 tightly against the screw 20 and hold the latter against displacement.

It is obvious that my invention as thus described, is capable of effective and efficient use for the purposes to which pistons of this nature are usually employed, and will in addition thereto, be light in weight, strong, durable, and adjustable to compensate for wear, in order that steady movement of the same in the bore of the cylinder may be maintained at all times.

It is further obvious that with my construction that the heat generated on the top 12 is but partially transmitted to the rings 10 and 11 owing to the multiplicity of ribs which are too narrow to convey the heat yet are strong enough to transmit the power impulses. These ribs may be of any suitable number.

I claim:

1. A piston comprising a closed head, rings axially alined therewith and spaced therefrom and one of which is enlarged at diametrically opposed points and bored to form wrist pin bearings, and ribs connecting the rings and head, the spaces between the rings, ribs, and head, being open, for the purpose described.

2. A piston comprising a closed head, rings axially alined therewith and spaced therefrom and one of which is enlarged at diametrically opposed points and bored to form wrist pin bearings, and ribs connecting the rings and head, certain of which ribs are connected across the lower inner surface of the closed head to provide a rigid arch between the same and the said wrist pin bearings.

3. A piston comprising a closed head, rings axially alined therewith and spaced therefrom and one of which is enlarged at diametrically opposed points and bored to form wrist pin bearings, and ribs connecting the rings and head, certain of which ribs at diametrically opposite points, being connected at their upper ends across the inner lower portion of the head and also connected to the said wrist pin bearings, to form a supporting arch for the latter, of inverted U-shape.

4. A piston comprising a close head having a hollow body provided with a transverse diametrical rib across its inner portion, rings axially alined with the head and spaced therefrom and from one another, one of which rings intermediate the ends of the piston being enlarged at diametrically opposite points and bored to form wrist pin bearings, and ribs connecting the rings and the head longitudinally of the piston and disposed at spaced points therearound, certain of said ribs having portions extending between the said wrist pin bearings and the said rib of the head, for the purpose described.

5. A skeleton piston including spaced intermediate and base rings connected at separate points therearound, and each of which is split at points between their connections, and means normally connecting the split portions of the rings and for adjustably spacing the ends of the rings to regulate the diameter of the latter.

6. A piston of the type described, including a closed head, spaced rings axially thereof, and separate connections between the ribs and the head, said ribs being split at points between the said connections thereof with the head, means for adjustably spacing the ends of each of the rings, and means for securely clamping the rings in adjusted position.

7. A piston of the type described, including a closed head, spaced rings axially thereof, and separate connections between the ribs and the head, said ribs being split at points between the said connections thereof with the head, and having its ends provided with inwardly projecting portions forming an apertured boss, the inner and outer surfaces of which are threaded and tapered, a tapered screw extending into the aperture of the boss, and a tapered clamping ring engaging the external threads of the boss, all for the purpose described.

GEORGE McCADDEN.

Witnesses:
ZELDA RASNICK,
GLADYS McCADDEN.